United States Patent
Ahlert et al.

[19]

[11] Patent Number: 6,010,601
[45] Date of Patent: Jan. 4, 2000

[54] METHOD OF MAKING MAGNETIC DISK WITH BORON CARBIDE OVERCOAT LAYER AND ADHESION LAYER

[75] Inventors: Richard Henry Ahlert, San Jose; James Kent Howard, Morgan Hill; Muhammad Inayet Ullah, Morgan Hill; Richard Donald Umphress, Morgan Hill, all of Calif.

[73] Assignee: International Business Machines Corporation, Armonk, N.Y.

[21] Appl. No.: 08/978,905

[22] Filed: Nov. 26, 1997

Related U.S. Application Data

[62] Division of application No. 08/626,813, Apr. 3, 1996, Pat. No. 5,750,231, which is a division of application No. 08/372,410, Jan. 13, 1995, Pat. No. 5,552,204.

[51] Int. Cl.[7] ............................. C23C 16/30; C23C 16/32
[52] U.S. Cl. ............................... 204/192.16; 204/192.2; 427/131; 427/249
[58] Field of Search ..................... 427/131, 249; 204/192.16, 192.2

[56] References Cited

U.S. PATENT DOCUMENTS

| | | | |
|---|---|---|---|
| 4,590,031 | 5/1986 | Eichen et al. | 264/338 |
| 4,717,632 | 1/1988 | Keem et al. | 428/698 |
| 4,724,169 | 2/1988 | Keem et al. | 427/249 |
| 4,840,844 | 6/1989 | Futamoto et al. | 428/336 |
| 4,883,711 | 11/1989 | Shiroishi et al. | 428/336 |
| 5,068,152 | 11/1991 | Mano et al. | 428/408 |
| 5,234,560 | 8/1993 | Kadlec et al. | 204/192.12 |
| 5,236,791 | 8/1993 | Yahisa et al. | 428/684 TP |
| 5,275,850 | 1/1994 | Kitoh | 427/577 |
| 5,552,204 | 9/1996 | Ahlert et al. | 428/65.5 |

FOREIGN PATENT DOCUMENTS

| | | |
|---|---|---|
| 61-110331 | 5/1986 | Japan . |
| 62-43821 | 2/1987 | Japan . |
| 62-263618 | of 1988 | Japan . |
| 64-79932 | 3/1989 | Japan . |
| 1-251313 | 10/1989 | Japan . |
| 4-75004 | 3/1992 | Japan . |
| 5-282661 | 10/1993 | Japan . |

OTHER PUBLICATIONS

G. A. Samara et al., Sandia National Laboratories, "Low Temperature Dielectric Properties and ac Conductivities of the Icosahedral Boron Carbides", © 1991 American Institute of Physics, pp. 77–84.

J. Rey et al., "Dry Friction and Wear of Chemically Vapour Deposited Boron Carbide Coatings", *Surface and Coatings Technology*, 36 (1988), pp. 375–386.

Yu. G. Gogotsi et al., "Tribochemical interactions of boron carbides against steel", *Wear*, 154(1992), pp. 133–140

S. Kaplan et al., Xerox Webster Research Center, "Characterization of amorphous carbon–hydrogent films by solid–state nuclear magnetic resonance", May 7, 1985, pp. 2–5.

M. F. Doerner and R. L. White, IBM General Products Div'n, "Characterization of Amorphous Carbon Films Using Substrate Curvature", pp. 647–656.

N. Savvides, *J. Appl. Phys.*, vol. 58, No. 1, Jul. 1985, "Four–fold to three–fold transition in diamond–like amorphous carbon films: A study of optical and electrical properties" pp. 518–521.

(List continued on next page.)

*Primary Examiner*—Stevan A. Resan
*Attorney, Agent, or Firm*—Gray Cary Ware; Freidenrich

[57] ABSTRACT

A significantly thinner boron carbide overcoat layer is provided for a magnetic disk which has the same durability as thicker prior art overcoat layers for protecting an underlying magnetic layer. By employing adhesion layers selected from the group consisting of Ge, Ru, WTiSi, WTi, Si, and Y between the magnetic layer and the overcoat layer, the durability of the overcoat layer is significantly increased over a single overcoat layer of B4C. Certain process steps in the making of the B4C overcoat layer still further enhance the durability of the B4C overcoat layer by maintaining the disk or substrate specimen at a floating potential in a plasma chamber and employing low levels of argon pressure and sputtering wattage.

38 Claims, 12 Drawing Sheets

OTHER PUBLICATIONS

Mark A. McKernan, "Magnetron sputter deposition of boron and boron carbide", *Surface and Coatings Technology*, 49 (1991), pp. 411–415.

M. K. Puchert et al., "Thickness–dependent stress in sputtered carbon films", *J. Vac. Sci. Technol. A*, vol. 12, No. 3, May/Jun. 1994, pp. 727–733.

R. Messier and R. C. Ross, "Evolution of microstructure in amorphous hydrogenated silicon", *J. Appl. Phys.*, vol. 53, No. 9, Sep. 1982, pp. 6220–6225.

S. Saito et al., "Wear–Resistant Properties of Protective Layers Applied to Thin Film Metallic Media", *IEEE Transactions on Magnetics*, vol. Mag–23, No. 5, Sep. 1987, pp. 2398–2400.

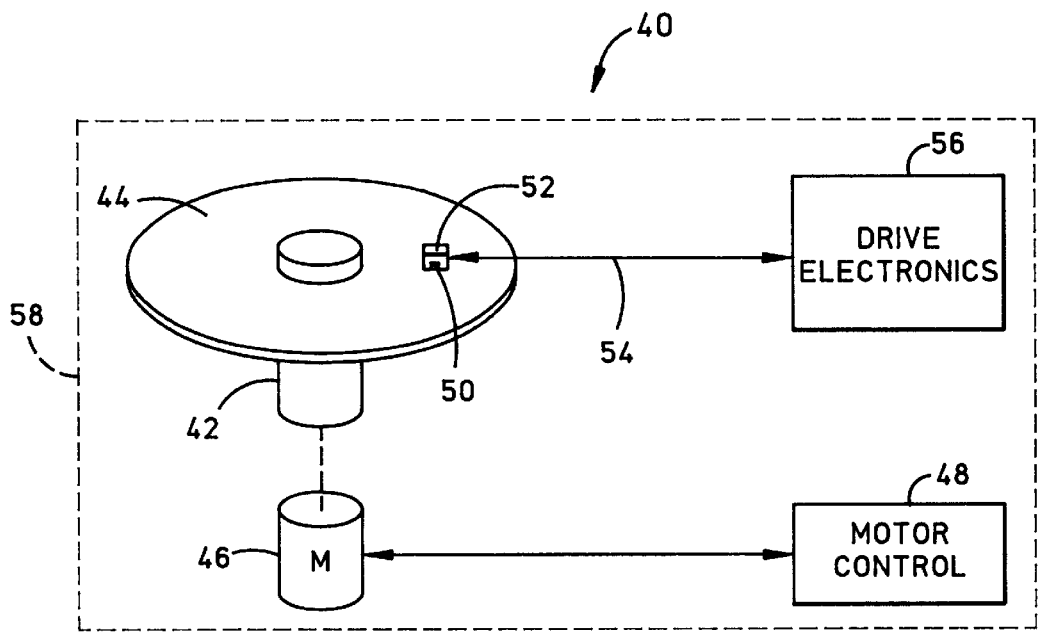
FIG. 1
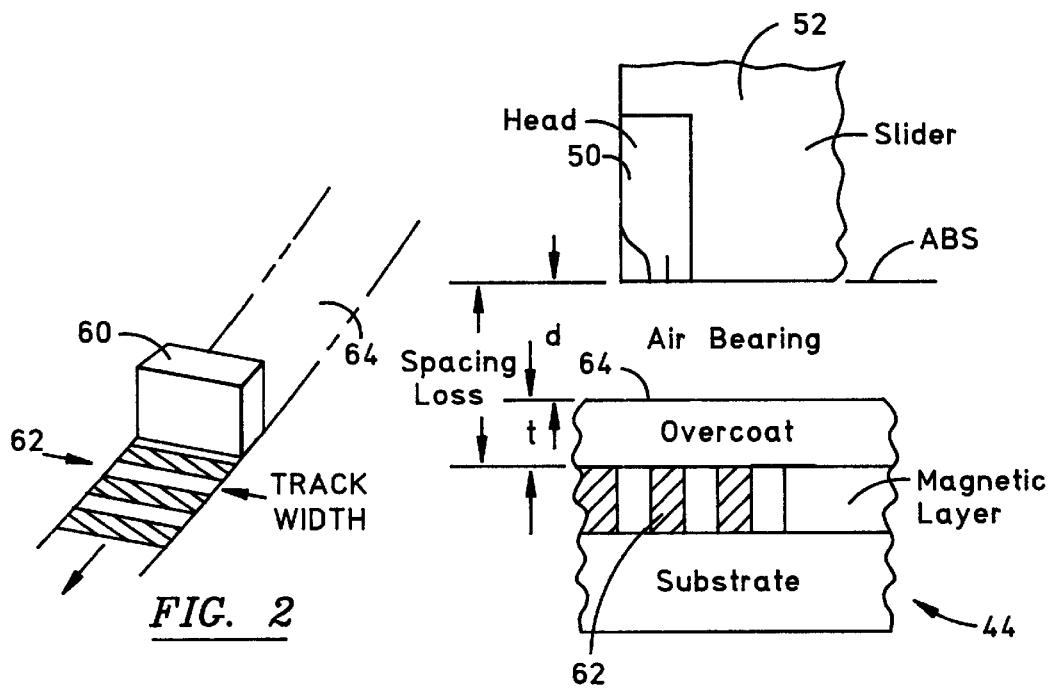
FIG. 2
FIG. 3

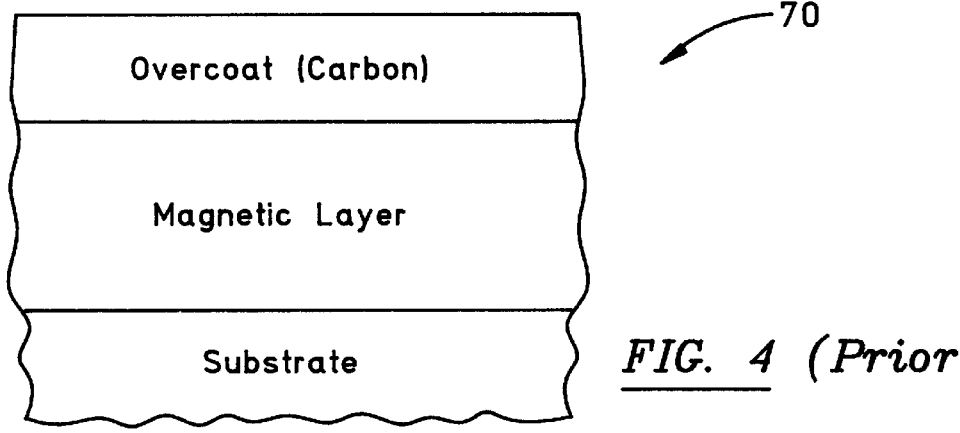
FIG. 4 *(Prior Art)*
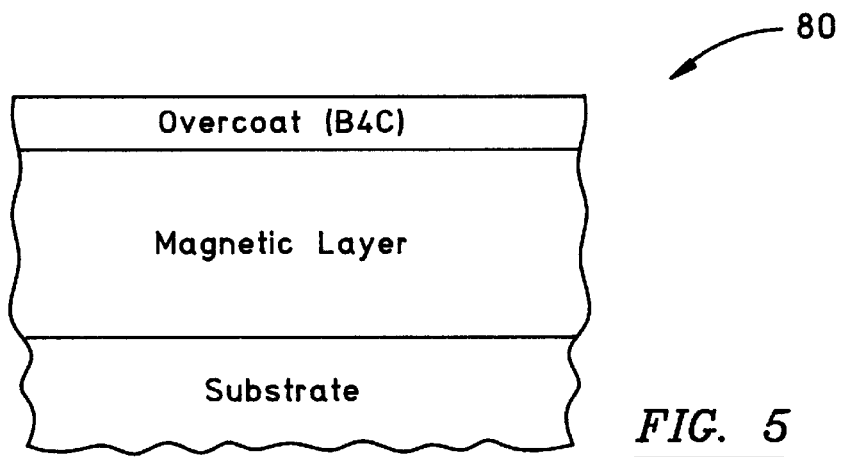
FIG. 5
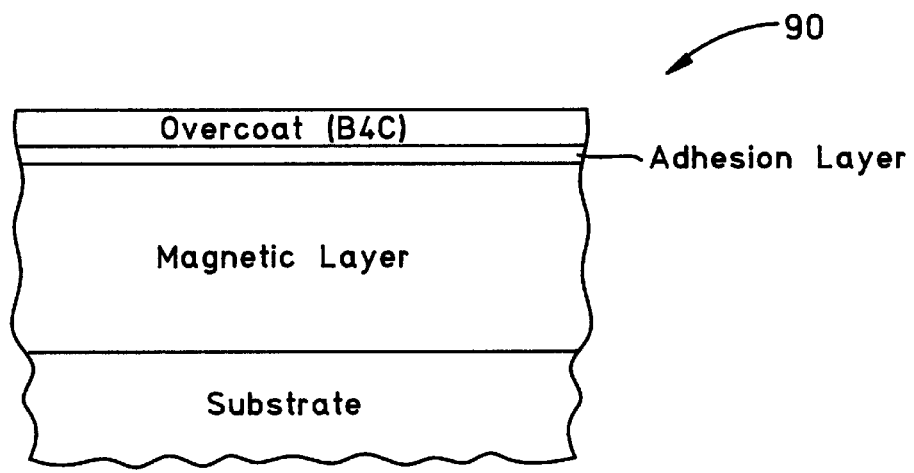
FIG. 6

FIG. 7 (Sputtering)

METHOD OF MAKING MAGNETIC DISK WITH BORON CARBIDE OVERCOAT LAYER AND ADHESION LAYER

CROSS REFERENCE TO RELATED APPLICATION

This is a divisional application of application Ser. No. 08/626,813 filed Apr. 3, 1996 now U.S. Pat. No. 5,750,231, which is a divisional application of issued application Ser. No. 08/372,410 filed Jan. 13, 1995, now U.S. Pat. No. 5,552,204.

BACKGROUND OF THE INVENTION

1. Field of the Invention

The present invention relates to a overcoat layer for a magnetic disk and more particularly to a very thin boron carbide overcoat layer which reduces spacing loss.

2. Description of the Related Art

A magnetic disk comprises a substrate, a magnetic layer on top of the substrate and an overcoat layer on top of the magnetic layer. The substrate provides support for the magnetic layer which can be magnetized with signal format and the overcoat layer protects the magnetic layer from wear due to contact with a slider. High density magnetic disk drives require that a magnetic head be positioned as close as possible to the magnetic layer of the disk. A typical drive has a density of about 1 gigabit per square inch ($Gb/in^2$) of disk area. A goal, which has been set by the National Storage Institute Consortium (NSIC), is to develop a 10 $Gb/in^2$ drive by the end of the 20th century. This means that bits must be written closer together in circular tracks on the disk, which is referred to as linear density, and the width of the circular tracks must be narrower, which is referred to as track density. The product of linear density and track density is referred to as areal density. As areal density is increased signal strength is decreased. As signal strength is decreased the magnetic head must be positioned closer to the magnetic layer of the disk in order to write and read weak signals with acceptable resolution. Two factors, which will be discussed hereinafter, impact on how close the magnetic head can be positioned to the magnetic layer of the disk, namely: (1) the flying height of the magnetic head above the disk and (2) the thickness of the overcoat layer on top of the magnetic layer of the disk.

The magnetic head is mounted on a slider which is supported by a suspension above a rotating disk. The suspension provides a slightly downward force which is counteracted by moving air which is generated by the rotating disk. The moving air provides an air bearing which supports the slider and magnetic head at a flying height slightly above the rotating disk. Considerable research is being undertaken to reduce the flying height in order to position the magnetic head as close as possible to the magnetic layer of the disk. The bulk of this research involves the configuration of the bottom surface of the slider which faces the disk, the bottom surface being referred to as an air bearing surface (ABS).

As stated hereinabove, the overcoat layer protects the magnetic layer from wear and damage caused by contact with the slider. When the disk starts rotating and stops rotating the slider takes off and lands on the disk. This is referred to as contact start and stop (CSS). In order to have acceptable durability the overcoat layer must withstand several hundred thousand contact starts and stops without noticeable wear. Unfortunately, the overcoat layer adds additional space between the magnetic head and the magnetic layer of the disk. The thickness of the overcoat layer adds to what is referred to as spacing loss. The typical overcoat layer is made from hydrogenated carbon. The thickness of this layer is 150 Å or more in order to be acceptably durable. There is a strong felt need to reduce this thickness in order to position the magnetic head closer to the magnetic layer of the disk.

Boron carbide has been recognized for its superb low coefficient of friction and wear capabilities. See "Dry Friction and Wear of Chemically Vapour Deposited Boron Carbide Coatings" by Rey, Kapsa and Male in "Surface and Coatings Technology, 36 (1988) 375 and "Tribochemical interactions of boron carbides against steel" by Gogotsi, Koval'chenko and Kossko in "Wear", 154 (1992) 122–140. The first article investigated 30 micron thick boron carbide layers and the second article reported on a 10 micron thick boron carbide layer for automobile engine components. U.S. Pat. No. 5,275,850 suggests chemical vapor deposition (CVD) of 200–300 Å of carbon and selected elements in specific ratios to form a protective layer for a magnetic disk. The patent also refers to various adhesion layers between the magnetic layer and the protective layer of the disk. U.S. Pat. No. 4,840,844 refers to 50–2000 Å thick boron carbide protective layers for (1) magnetic disks where the carbon constituent increases from the underlaying magnetic layer toward the surface of the disk or (2) where the boron carbide layers are laminated with carbon layers. The patent did not provide any examples of protective layers less than 200 Å.

SUMMARY OF THE INVENTION

We have discovered that when the overcoat layer of a magnetic disk is made of boron carbide that it can be made thinner than prior art overcoat layers with the same or better durability. Acceptable durability can be achieved with a 50 Å thick boron carbide overcoat layer as compared to a prior art 150 Å thick hydrogenated carbon overcoat layer. We have further discovered that certain adhesion layers between the magnetic layer and the overcoat layer provide improved durability. As an example a 10 Å thick adhesion layer directly on top of the magnetic layer and a 50 Å thick boron carbide overcoat layer directly on top of the adhesion layer provides a significant increase in durability over a boron carbide layer without the adhesion layer. Another discovery was made during the making of the boron carbide overcoat layer. It was found that when the substrate of the disk was maintained at a floating bias or electrical potential while the boron carbide layer was sputtered on the top of the magnetic layer that a more durable boron carbide overcoat layer was produced. The boron carbide overcoat layer was made still further durable by employing a low pressure argon atmosphere and a low wattage sputtering level.

An objective of the present invention is to provide a durable magnetic disk drive which has less head-to-disk spacing loss than prior art durable magnetic disk drives.

Another objective is to provide a durable magnetic disk which has an overcoat layer less than 100 Å thick.

A further objective is to provide a magnetic disk with an overcoat layer about 50 Å thick which will withstand several hundred thousand contacts and starts without noticeable wear.

Still another objective is to provide an adhesion layer between the magnetic layer and the overcoat layer of a magnetic disk which significantly increases the durability of the overcoat layer.

Still a further objective is to provide a process of making an overcoat layer for a magnetic disk which enhances the durability of the overcoat layer.

Other objectives and attendant advantages of the invention will become apparent upon reading the following description taken together with the accompanying drawings.

BRIEF DESCRIPTION OF THE DRAWINGS

FIG. 1 is a schematic illustration of a disk drive which employs the magnetic disk of the present invention.

FIG. 2 is a schematic illustration of one or more transducing elements of a magnetic head reading and/or writing magnetic bits of information to a circular track of a magnetic disk.

FIG. 3 is a vertical schematic illustration of a magnetic head flying above a top surface of a magnetic disk.

FIG. 4 is a partial vertical cross-sectional view of a prior art magnetic disk.

FIG. 5 is a partial cross-sectional view of one embodiment of the present invention.

FIG. 6 is a partial cross-sectional view of another embodiment of the present invention.

DESCRIPTION OF THE PREFERRED EMBODIMENTS

Figure 7:
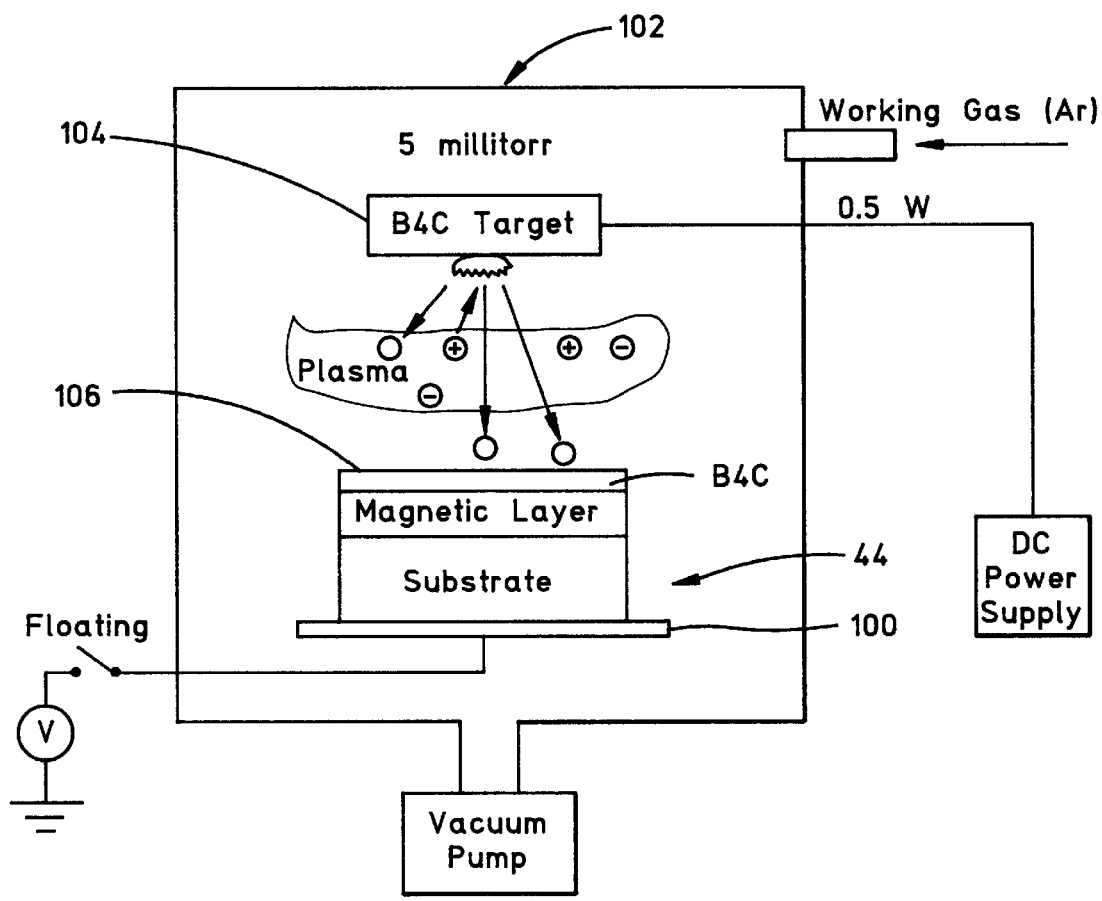
FIG. 7 is a schematic illustration of a boron carbide overcoat layer being sputtered on a magnetic disk within a chamber.

Referring now to the drawings wherein like reference numerals designate like or similar parts throughout the similar views, there is illustrated in FIG. 1 a magnetic disk drive 40 which includes a spindle 42 for supporting a magnetic disk 44. The disk 42 is rotated by a motor 46 which is responsive to control signals from motor control 48. When the disk 42 is rotated, a thin film magnetic head 50, mounted on a slider 52, is supported above a surface of the magnetic disk 42 by a thin layer of air called an "air-bearing." The magnetic head 50 typically includes a write head and a read head for recording and playing back signals on the magnetic disk. The slider 52 is mounted to a head suspension assembly 54 which includes means for conducting read/write signals between drive electronics 56 and the head. The above components of the drive are mounted within a drive housing 58.

FIG. 2 is a schematic illustration of read and/or write components 60 of the magnetic head 50 for reading and/or writing bits 62 on a circular track 64 of the magnetic disk 44. The density capability of the drive 40, shown in FIG. 1, is determined by the length of the written bits 62 and the width of the track 64, as shown in FIG. 2. The length of the bits 62 determines the linear density of the magnetic head and the width of the track 64 determines the track width density of the magnetic head. The linear density is typically expressed as the number of bits per linear inch (BPI) and the track density is typically expressed as tracks per inch (TPI). The combination of linear density and track width density provides bit density per square inch which is known as areal density. The areal density is the density capability of the drive 40. As the areal density increases, the signal strength of the bits 62 decreases, requiring the read and/or write components 60 of the magnetic head to be closer to the surface of the magnetic disk 44.

FIG. 3 is a schematic illustration of the slider 52 and the magnetic head 50 supported above the magnetic disk 44 by the air bearing. The air bearing is moving air which is generated by the rotation of the magnetic disk 44 of the drive 40. The bottom surfaces of the slider 52 and the magnetic head 50 are in a plane which is referred to as an air bearing surface (ABS). The ABS is spaced from a top surface 64 of the magnetic disk 44 by a distance d, which is the fly height, when the magnetic disk is rotating. The magnetic disk 44 includes a substrate layer, which provides support, a magnetic layer, which is magnetized with bits 62, and an overcoat layer, which provides protection of the magnetic layer from the slider 52. When the magnetic disk 44 is not rotating, the air bearing surface of the slider 52 rests directly on top 64 of the overcoat layer. When the magnetic disk 44 commences rotation, the slider 52 and the magnetic head 50 are lifted by the air bearing counteracting a downward force of the suspension assembly 54. When the magnetic disk 44 stops rotating, the slider 52 lands on the top 64 of the overcoat and comes to rest in contact therewith. This cycle is referred to as contact start and stop (CSS). The expected life of a drive 40 can be anywhere between 200,000 to a million CSS. Each contact start and each contact stop brings the air bearing of the slider 52 and the magnetic head 50 into dynamic frictional engagement with the top 64 of the overcoat. In prior art heads, the overcoat has been at least 150 Å thick in order to provide sufficient durability for several hundred thousand CSS. This thickness adds to the spacing loss between the ABS and the magnetic layer of the disk, as shown in FIG. 3. As discussed hereinabove, the fly height also causes signal loss and this is being addressed by other research efforts to reduce the fly height by appropriately configuring the ABS of the slider. In order to produce higher density disk drives, such as the aforementioned goal of a 10 $Gb/in^2$ disk drive, it is necessary to reduce the thickness of the overcoat layer which equates to reducing the spacing loss.

FIG. 4 shows a partial vertical cross-sectional view of a prior art magnetic disk 70. This prior art disk typically includes a substrate, a magnetic layer, and a 150 Å thick hydrogenated carbon overcoat layer as protection for the magnetic layer. FIG. 5, which is a similar view to FIG. 4, illustrates one embodiment 80 of the invention wherein a 75 Å thick boron carbide (B4C) overcoat layer is employed. In tests, which will be described in more detail hereinbelow, this embodiment can withstand indefinite contact start and stop cycles and is at least as durable as the 150 Å thick hydrogenated carbon overcoat layer shown for the prior art magnetic disk 70 in FIG. 4.

FIG. 6, which is a similar illustration as FIGS. 4 and 5, shows still another embodiment 90 of the present invention which employs an adhesion layer between the magnetic layer and the boron carbide overcoat layer. We have discovered that certain adhesion layers surprisingly increase the durability of the boron carbide overcoat layer. These adhesion layers are selected from a group consisting of germanium (Ge), ruthenium (Ru), tungsten/titanium/silicon (WTiSi), tungsten/titanium (WTi), silicon (Si) and yttrium (Y). In one embodiment, a highly durable boron carbide overcoat layer was obtained by forming a 10 Å thick adhesion layer on the magnetic layer and forming the 50 Å thick boron carbide layer on the adhesion layer.

FIG. 7 schematically illustrates a preferred method of forming the boron carbide layer on top of the magnetic layer of the disk 44. The substrate and the magnetic layer were supported on a rotatable platform 100 within a plasma chamber 102. The chamber was filled with argon gas at a pressure of 5 millitorr. A DC voltage with low wattage of 0.5 W (sputtering power) was applied to a B4C target 104 so that B4C particles were sputtered from the target when bombarded by argon ions. The B4C particles are transported through the plasma stream to the magnetic disk 44 where they are deposited as a B4C layer 106. The deposition rate was kept at about 5–6 Å/min. We have found that the durability of the B4C layer 106 is significantly increased by floating the potential of the substrate of the magnetic disk 44 rather than grounding or biasing the substrate, as will be explained in more detail hereinafter. We also employed sputtering powers of 0.75 KW, 1.00 KW, and values above 1.00 KW. 0.75 KW sputtering power provided the B4C layer with excellent durability which was equivalent to the durability achieved at 0.5 KW sputtering power. At 1.0 KW sputtering power, the durability degraded and continued to degrade with higher sputtering levels. Accordingly, we conclude that sputtering power should be below 1.0 KW. Further, we found that DC sputtering power produces roughly the same durable B4C layer 106 as RF sputtering power. The durability of the boron carbide layer 106 also increased by employing the aforementioned low pressure argon atmosphere of 5 millitorr. These latter mentioned advantages will be described in more detail hereinafter.

It should be understood that the magnetic disks shown in FIGS. 4–7 may include additional layers. For instance, between an aluminum substrate layer and the magnetic layer there may be a NiP layer directly on top of the substrate and a CrV layer directly on top of the NiP layer. When one layer is expressed herein as being on top of another layer, this is to include an embodiment where one or more intermediate layers is or is not located therebetween.

Fifteen examples are provided hereinafter setting forth test results on durability of overcoat layers of boron carbide (B4C) and hydrogenated carbon (H-C). Most of the examples set forth are drag tests and contact start and stop tests. In both tests a slider of titanium carbide (TiC) was employed with a downward pressure on the overcoat layer of 10.5 gms. In all tests the tops of the overcoat layers were lubricated with a thin layer of perfluoropolyether. In the drag test the magnetic disk was rotated with a number of revolutions and in the contact start and stop test, one contact start and one contact stop is referred to as a cycle. The drag test was employed more often since it provides quicker results and is indicative of contact start and stop testing. The material employed for the magnetic layer of the disk was cobalt/platinum/chromium (CoPtCr) and the substrate material was an aluminum alloy covered by a thin layer of nickel phosphorous (NiP). The magnetic layer was approximately 100–300 Å thick. Tests were conducted on textured and untextured disks. Texturing can commence at the substrate level and is replicated in subsequent layers. Texturing is represented by Ra (average roughness) with a textured disk being approximately 55 to 60 Å and an untextured disk being approximately 3 to 10 Å. When testing indicated that there was substantially no wear after numerous revolutions during a drag test or numerous cycles during a contact start and stop test, the test was truncated which means that the test was terminated. The following "Table of Examples" provides the figure number corresponding to each example and X's are placed to indicate whether the test was a drag test or a contact start and stop test, whether boron carbide (B4C) and/or hydrogenated carbon (H-C) was tested, whether one or more adhesion layers were employed, and whether a magnetic layer was employed. The surface roughness (Ra) of tile disk employed is expressed in angstroms (Å).

TABLE OF EXAMPLES

| Example | FIG. | Drag | CSS | B4C | H—C | Adhesion Layer(s) | Magnetic Layer | Ra (Å) |
|---|---|---|---|---|---|---|---|---|
| 1 | 8 | X |  | X | X |  | X | 2.5–3.0 |
| 2 | 9 |  | X | X | X |  | X | 55–60 |
| 3 | 10 | X |  | X |  |  |  | 55–60 |
| 4 | 11 | X |  | X |  | X |  | 55–60 |
| 5 | 12 | X |  | X | X | X |  | 2.5–3.0 |
| 6 | 13 | X |  | X | X | X | X | 2.5–3.0 |
| 7 | 14 | X |  | X | X | X | X | 8.0–10.0 |
| 8 | 15 |  | X | X | X | X | X | 55–60 |

TABLE OF EXAMPLES-continued

| Example | FIG. | Drag | CSS | B4C | H—C | Adhesion Layer(s) | Magnetic Layer | Ra (Å) |
|---|---|---|---|---|---|---|---|---|
| 9 | 16 | | X | X | X | X | | 55–60 |
| 10 | 17 | X | | X | X | X | X | 6.0–10 |
| 11 | 18 | X | | X | | X | X | 2.5–3.0 |
| 12 | 19 | X | | X | | X | X | 2.5–3.0 |
| 13 | 20 | X | | X | | X | X | 2.0–3.0 |
| 14 | 21 | X | | X | | X | X | 3.0–4.0 |
| 15 | 22 | X | | X | | X | X | 3.0–4.0 |

EXAMPLE 1

Figure 8:
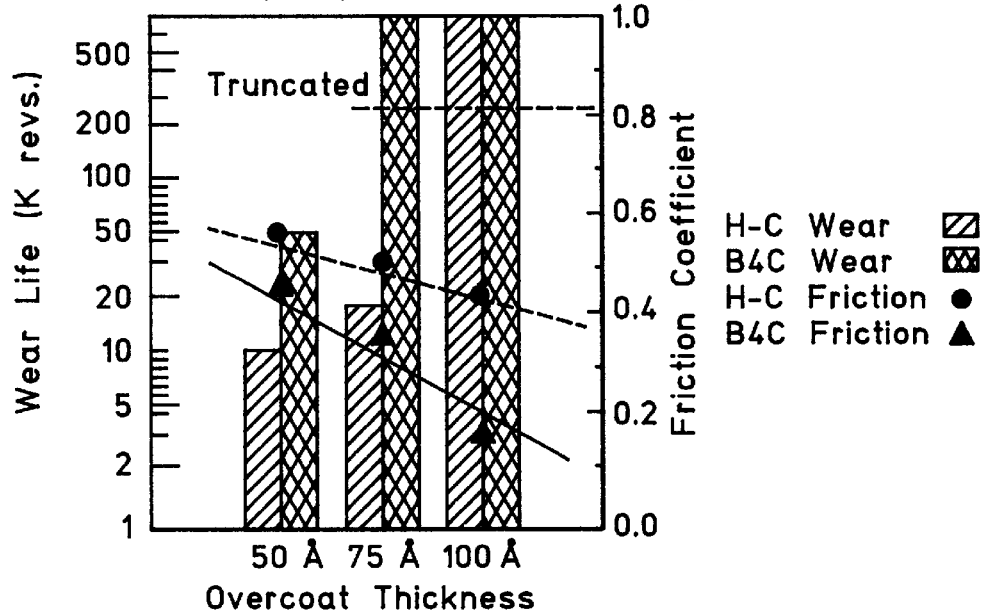
FIG. 8 is a graph showing drag tests on ultrasmooth disks which show various thicknesses of boron carbide and various thicknesses of hydrogenated carbon versus wear life and dynamic friction coefficient values.

Example 1, which is shown in FIG. 8, compares durability in the form of wear life and values of dynamic friction coefficient for various overcoat thicknesses of B4C and H-C. This example shows that a 75 Å thick B4C overcoat layer has significantly improved durability over the prior art H-C overcoat layer of the same thickness. No adhesion layer was used in these structures.

EXAMPLE 2

Figure 9:
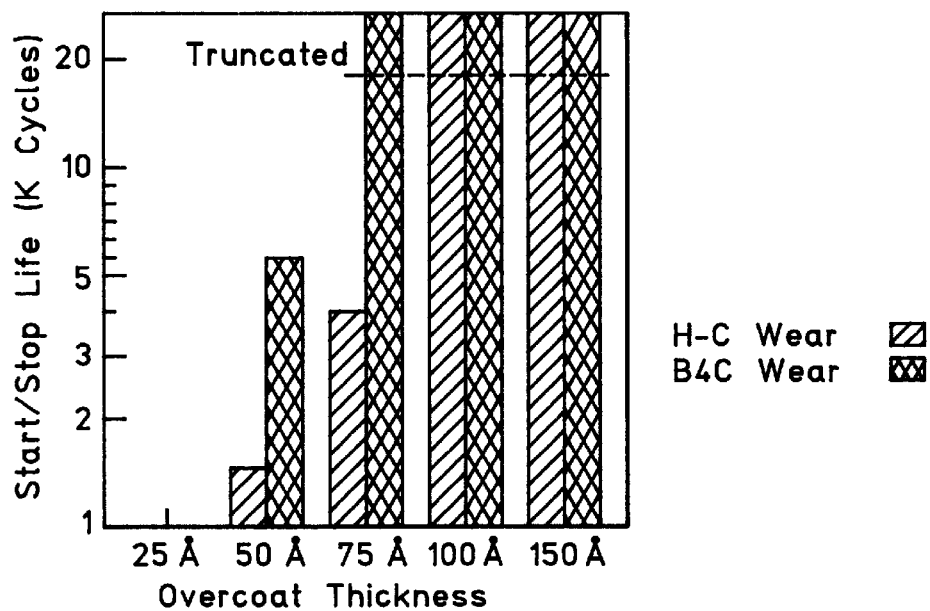
FIG. 9 is a graph showing the results of contact start/stop (CSS) tests of boron carbide and hydrogenated carbon on textured disks.

Example 2, which is shown in FIG. 9, compares various thicknesses of overcoat layers of B4C and H-C under many thousands of cycles of contact starts and stops. Again, this example shows that a 75 Å thick B4C overcoat layer has significantly greater durability than a 75 Å H-C overcoat layer.

EXAMPLE 3

Figure 10:
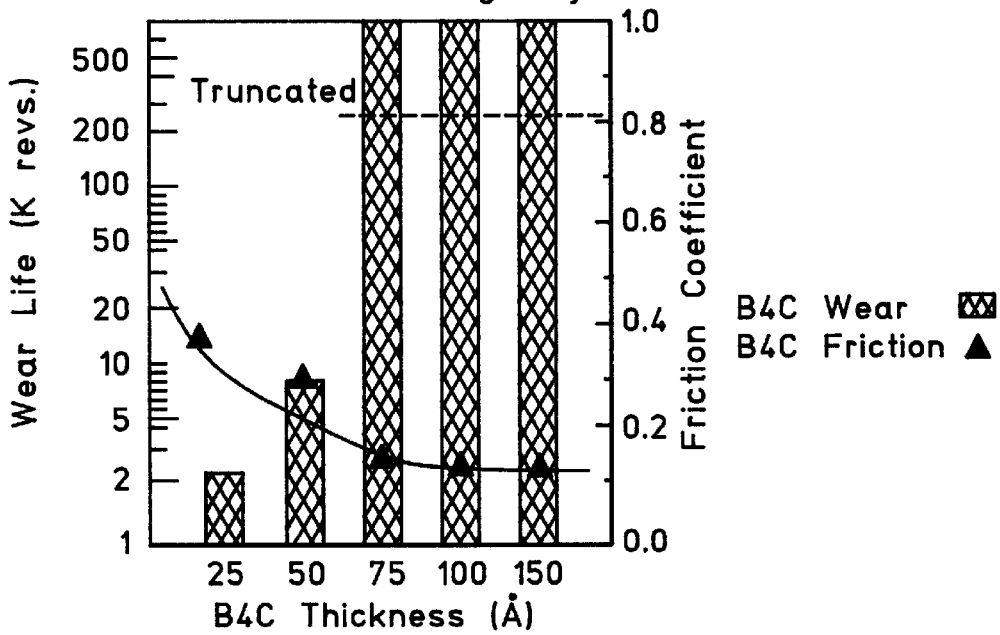
FIG. 10 is a graph showing the results of contact drag tests of boron carbide.

Example 3, which is shown in FIG. 10, differs from the previous examples in that a 25 Å thick silicon adhesion layer was employed between the magnetic layer and the overcoat layer and the overcoat layer tested was only B4C. Using the drag test mode, it can be seen that a 50 Å thick B4C overcoat layer had slightly improved durability with the 25 Å silicon adhesion layer.

EXAMPLE 4

Figure 11:
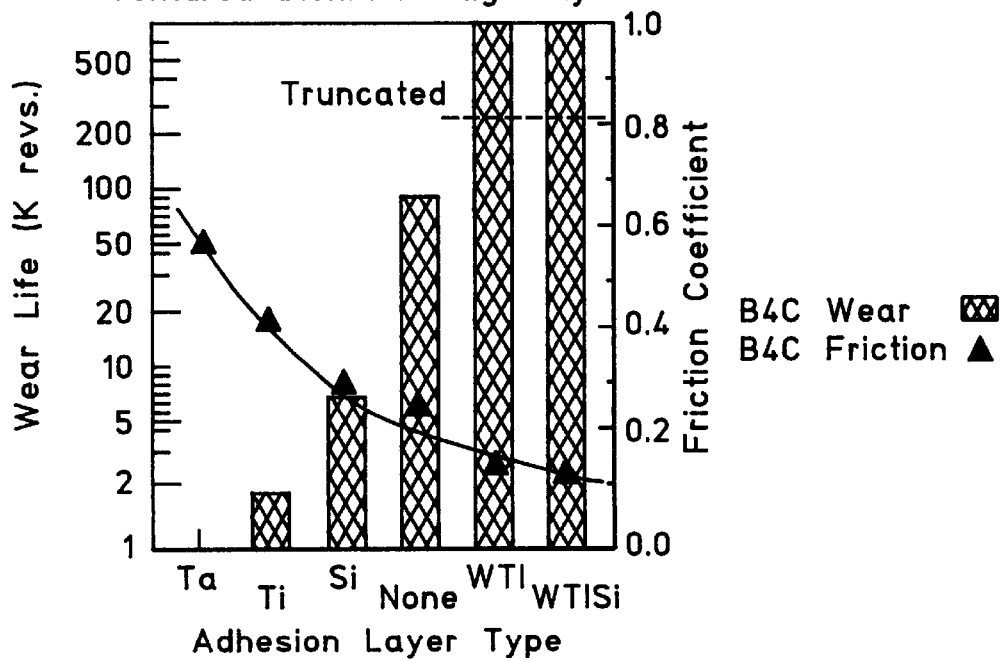
FIG. 11 is a graph showing the results of drag tests of boron carbide when various adhesion layers are employed.

Example 4, which is shown in FIG. 11, is a drag test indicating durability in the form of wear life and friction coefficient values for 25 to 35 Å thick of various adhesion layers on top of the magnetic layer and 50±10 Å B4C overcoat layer on top of the adhesion layer. Without any adhesion layer, it can be seen that the wear life of the B4C overcoat layer is approximately 100,000 revolutions and the friction coefficient is approximately 0.3 grams. When adhesion layers of silicon (Si) or titanium (Ti) were employed, the durability of the B4C overcoat layer actually degraded. However, when the adhesion layer was tungsten/titanium (WTi) or tungsten/titanium/silicon (WTiSi), the durability of the B4C overcoat layer was significantly increased. It is suspected that the latter two compounds bond to the carbon atoms of the B4C overcoat layer. This in combination with diffusion of these compounds with the magnetic layer results in improved bonding strength of the B4C and adhesion layers as compared to the B4C layer without the adhesion layer. Accordingly, the B4C overcoat layer is bonded more securely to the magnetic layer via the adhesion layer resulting in increased durability of the B4C overcoat layer.

EXAMPLE 5

Figure 12:
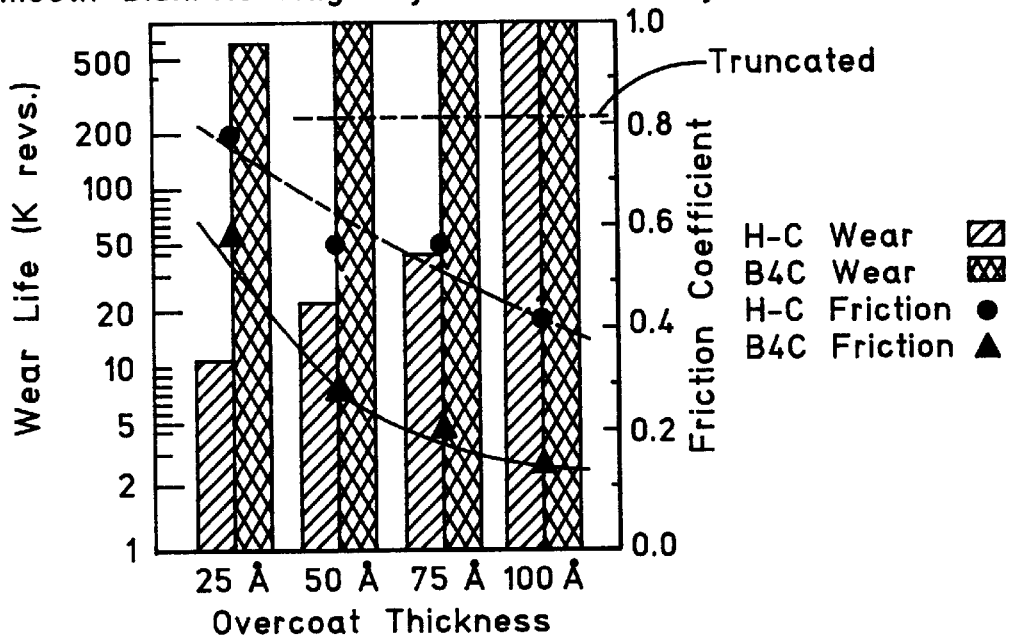
FIG. 12 is a graph showing the results of drag tests for various thicknesses of boron carbide and hydrogenated carbon.

Example 5, which is shown FIG. 12, compares the durability in form of wear life and friction coefficient of various thicknesses of B4C and H-C overcoat layers when a 25 Å thick tungsten/titanium (WTi) adhesion layer is employed with the B4C overcoat layer and a 25 Å thick silicon (Si) is employed with H-C overcoat layer. It can be seen from this test that 50 Å, 75 Å or 100 Å thick B4C overcoat layers resulted in substantially no wear and was therefore truncated at approximately 600,000 revolutions. In contrast it can be seen that a H-C overcoat layer less that 100 Å thick suffered significant wear and therefore would not be practical as an overcoat for a magnetic disk. The substrate used in this test was very smooth. Ra or average roughness was 2.5–3.5 Å. This test did not employ an underlying magnetic layer so it is not indicative of the actual environment. The next example employs the magnetic layer.

EXAMPLE 6

Figure 13:
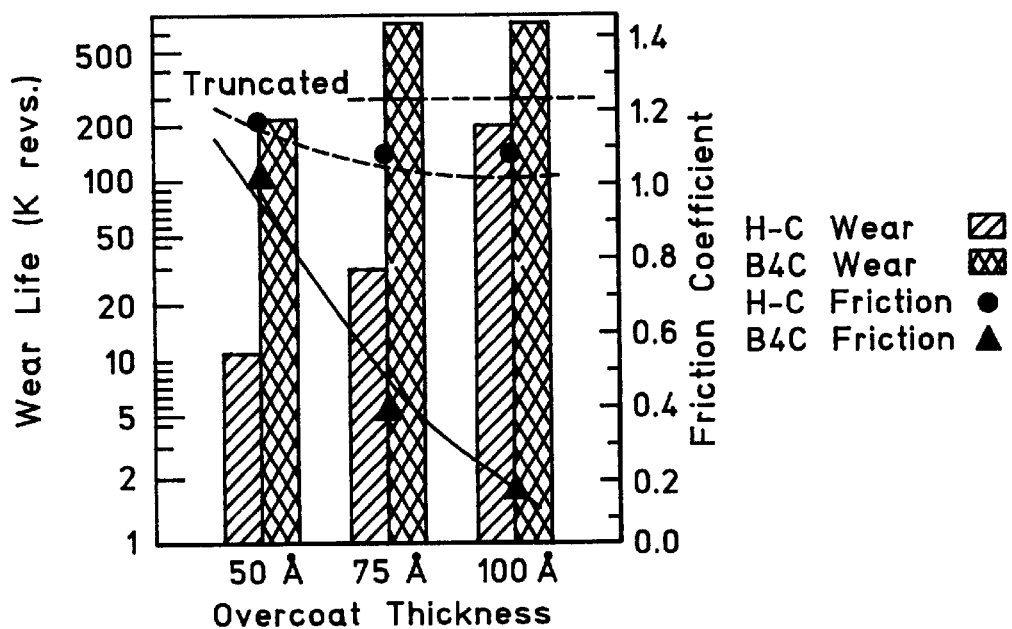
FIG. 13 is a graph showing the results of drag tests for various thicknesses of boron carbide and hydrogenated carbon.

Example 6, which is shown in FIG. 13, is the same test as Example 5, shown in FIG. 12, except a magnetic layer is employed in this test. It can be seen in this test that the magnetic layer decreases the durability of a 50 Å thick B4C overcoat layer as compared to the 50 Å thick overcoat layer shown in FIG. 12. However, this example shows that with thicknesses of 50 Å, 75 Å or 100 Å, the B4C layer had durability which was many times greater than the durability of the H-C overcoat layer.

EXAMPLE 7

Figure 14:
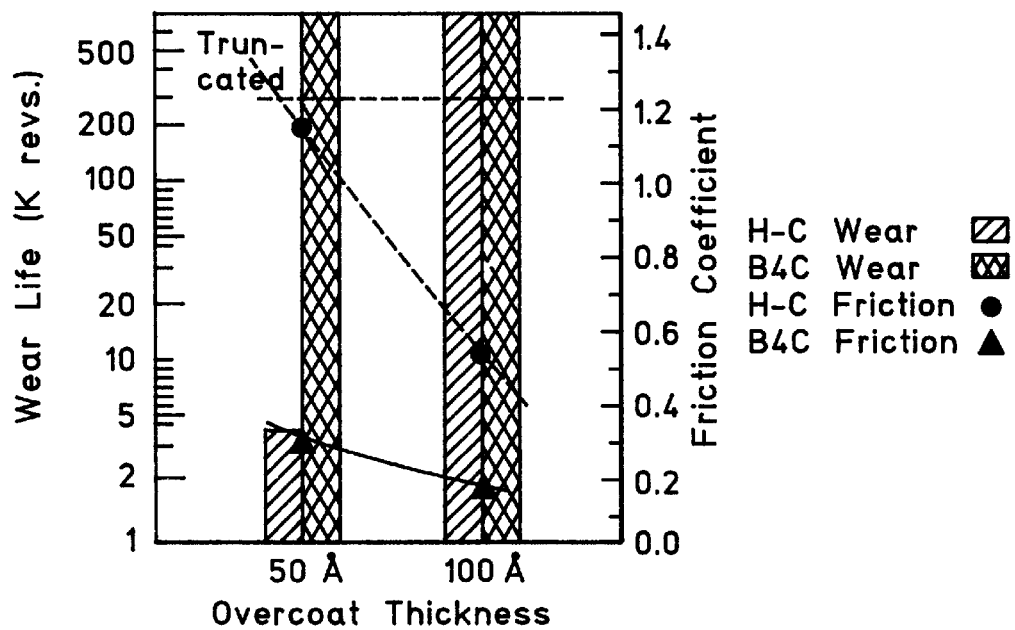
FIG. 14 is a graph showing the results of drag tests of various thicknesses of boron carbide and hydrogenated carbon on untextured disks.

Example 7, which is shown in FIG. 14, employs the same adhesion layers as in Examples 5 and 6 shown in FIG. 12 and 13 and a magnetic layer as employed in Example 6 and as shown in FIG. 13 with the exception that the underlying substrate was untextured, and Ra or average roughness was 8–10 Å. This Example employed a drag test to compare the durability in the form of wear life and friction coefficient values of overcoat layers of B4C and H-C. This test shows that at, 50 Å thick, the durability of the B4C overcoat layer was many times greater than the durability of the H-C overcoat layer.

EXAMPLE 8

Figure 15:
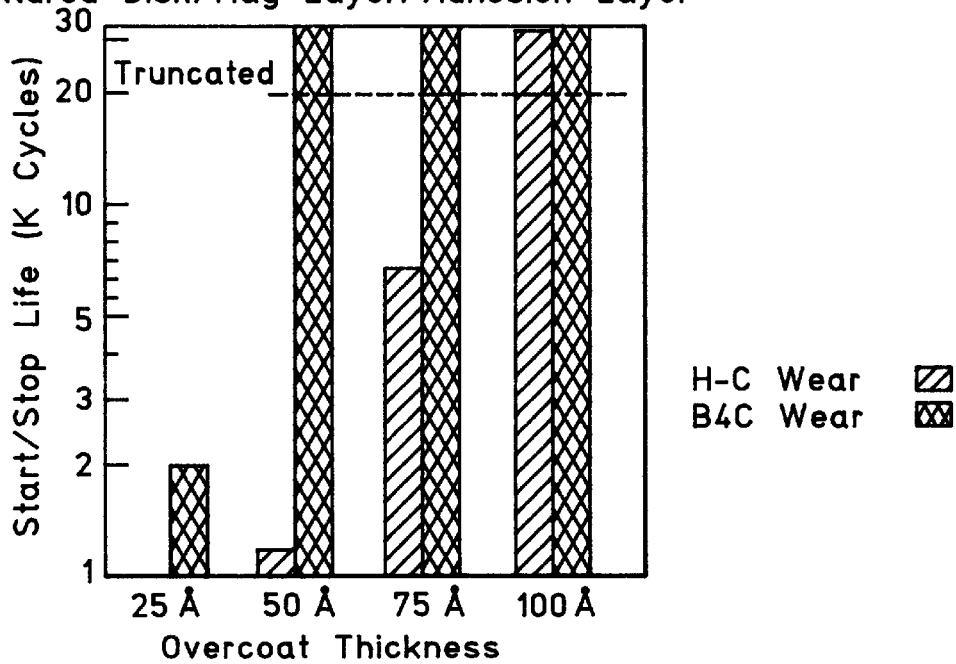
FIG. 15 is a graph which shows the results of contact start/stop (CSS) tests of various thicknesses of boron carbide and hydrogenated carbon.

Example 8, which is shown in FIG. 15, employed the same adhesion layers and the magnetic layer as employed in Example 7, shown in FIG. 14. This test differs from Example 7 in that it is a contact start/stop test instead of a drag test. From this test it can be seen that with thicknesses of 50 Å and 75 Å the B4C, the overcoat layer had durability many times greater than the durability of the H-C overcoat layer.

EXAMPLE 9

Figure 16:
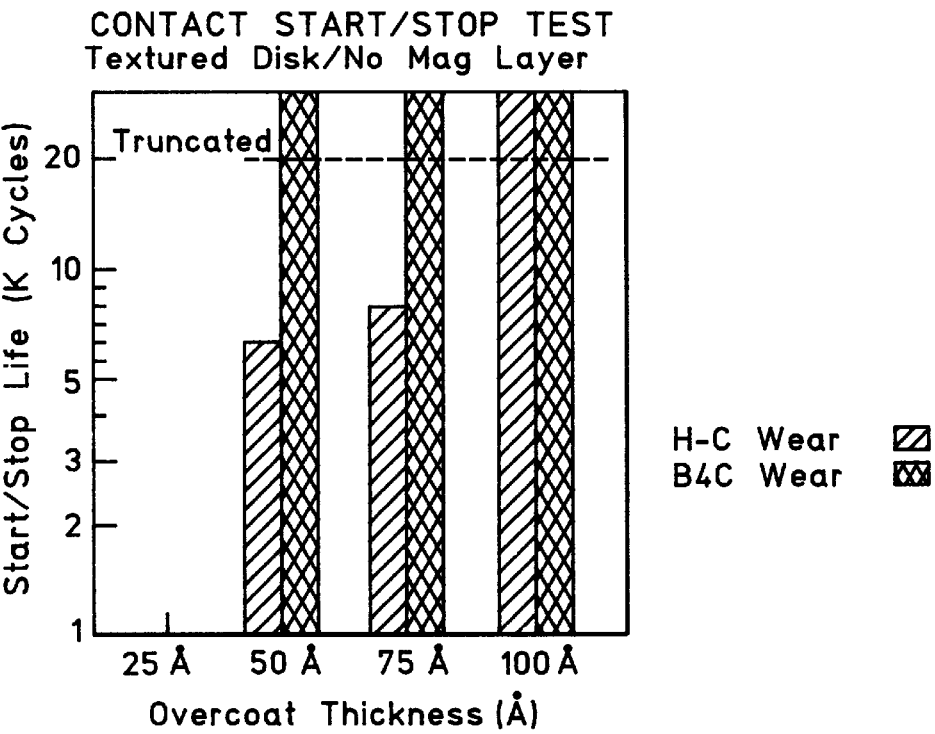
FIG. 16 is a graph which shows results of CSS tests of various thicknesses of boron carbide and hydrogenated carbon.

Example 9, which is shown in FIG. 16, is a contact start/stop test comparing the durability in the form of thousands of cycles of contact starts and stops of various thicknesses of B4C overcoat layers and H-C overcoat layers. A 25 Å thick silicon adhesion layer was employed for both overcoat layers. From this test it can be seen that at thicknesses of 50 Å and 75 Å the durability of the B4C overcoat layer was significantly greater than the durability of the H-C overcoat layer.

EXAMPLE 10

Figure 17:
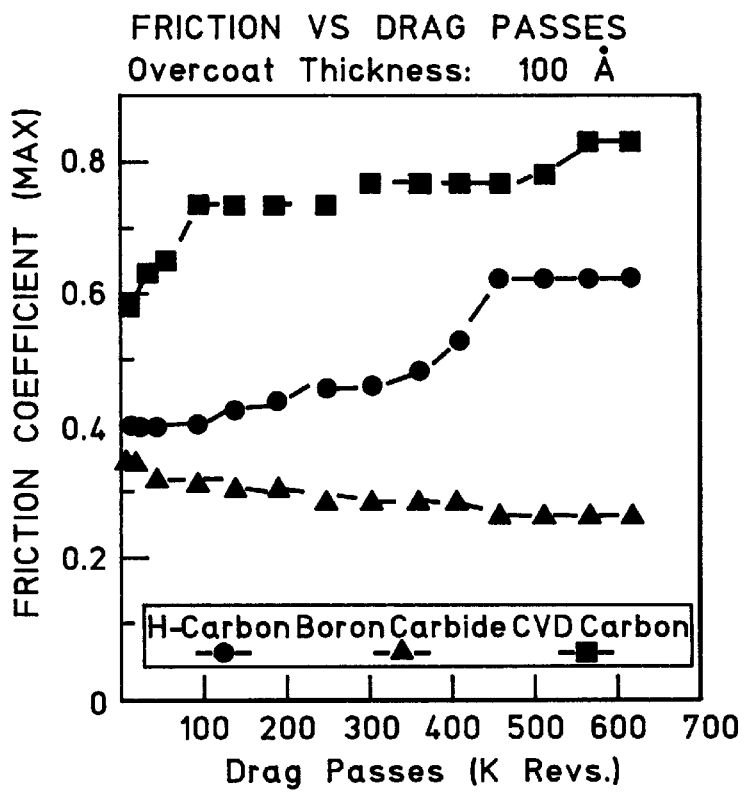
FIG. 17 is a graph showing dynamic friction coefficient results of a drag test for boron carbide, hydrogenated carbon, and CVD carbon.

Example 11, which is shown in FIG. 17, employs a drag test to compare the dynamic friction coefficients for 100 Å thick overcoat layers of B4C, H-C and CVD carbon with a magnetic layer of cobalt/nickel/chrome (CoNiCr) being employed with the B4C and H-C overcoat layers and a magnetic layer of cobalt/platinum/chromium (CoPtCr) being employed with the CVD carbon overcoat layer. It can be seen from this test that the coefficient of friction for the H-C and CVD carbon overcoat layers gradually increased with the number of revolutions whereas the coefficient of friction of the B4C overcoat layer remained low even after 500,000 drag passes or revolutions.

EXAMPLE 11

Figure 18:
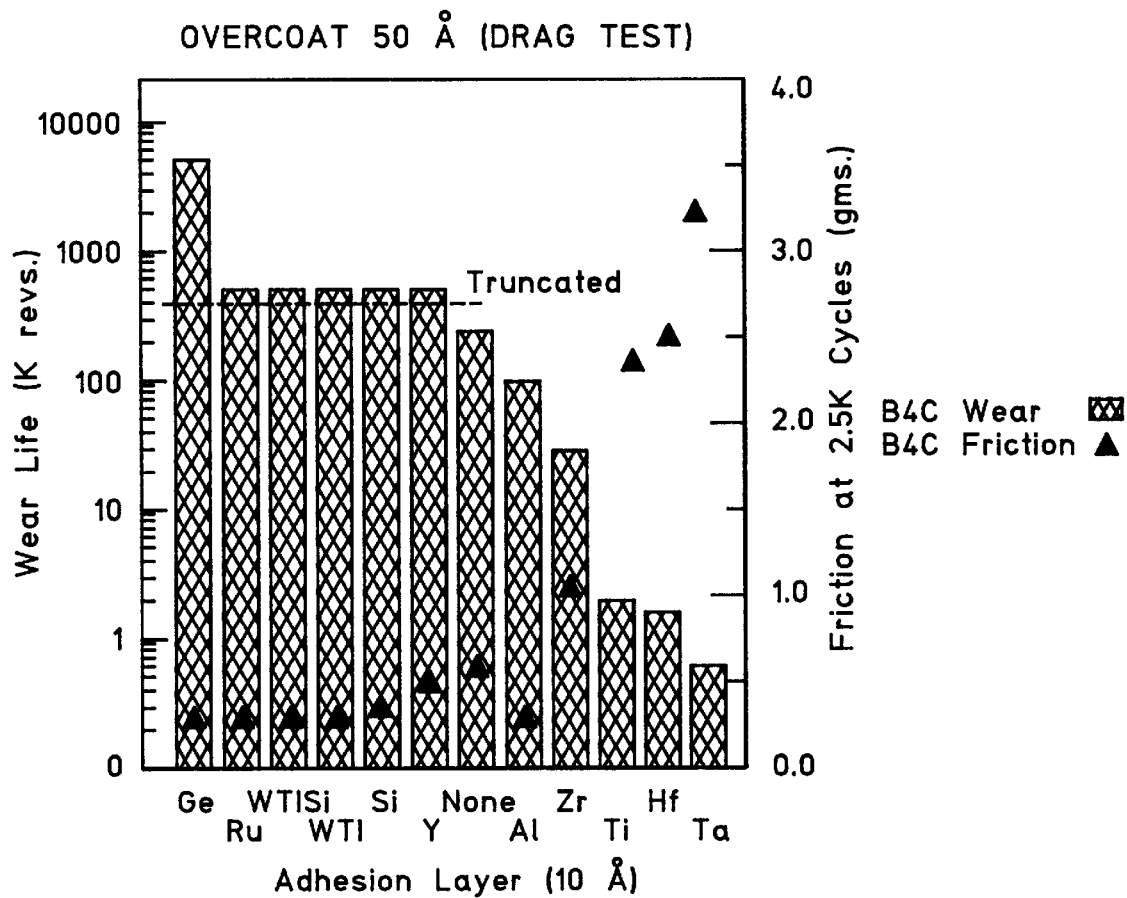
FIG. 18 is a graph showing the results of drag tests of boron carbide in combination with various adhesion layers.

Example 11, which is shown in FIG. 18, is a drag test measuring the durability in the form of wear life and friction coefficient values of a 50 Å thick B4C overcoat layer and 10 Å thick of various adhesion layers over a 100 Å thick cobalt/platinum/chromium (CoPtCr) magnetic layer which was, in turn, over a 100 Å thick chromium/vanadium (CrV) underlayer. From the graph it can be seen that when no adhesion layer was employed the wear life of the B4C overcoat layer was approximately 120,000 revolutions. When adhesion layers of aluminum (Al), zirconium (Zr), titanium (Ti), hafnium (Hf) or tantalum (Ta) were employed the wear life of the B4C overcoat layer actually decreased. However, if the adhesion layer was germanium (Ge), ruthenium (Ru), tungsten/titanium/silicon (WtTiSi), tungsten/titanium (WtTi), silicon (Si) or yttrium (Y) the wear life was increased. A test employing germanium as an adhesion layer was continued to 5,000,000 revolutions with no noticeable wear. Si in this test shows improved durability when compared to the test in Example 4 (FIG. 11). There are three major differences in these two tests. The first test (FIG. 11) was done on a rough disk (Ra=55–60Å), without any magnetic layer, and the substrate was grounded. In the present test (FIG. 18), we used a smooth disk, a magnetic layer, and the substrate was kept floating. Of these differences, we believe that floating the substrate may be the key factor in improving the performance of Si adhesion layers.

EXAMPLE 12

Figure 19:
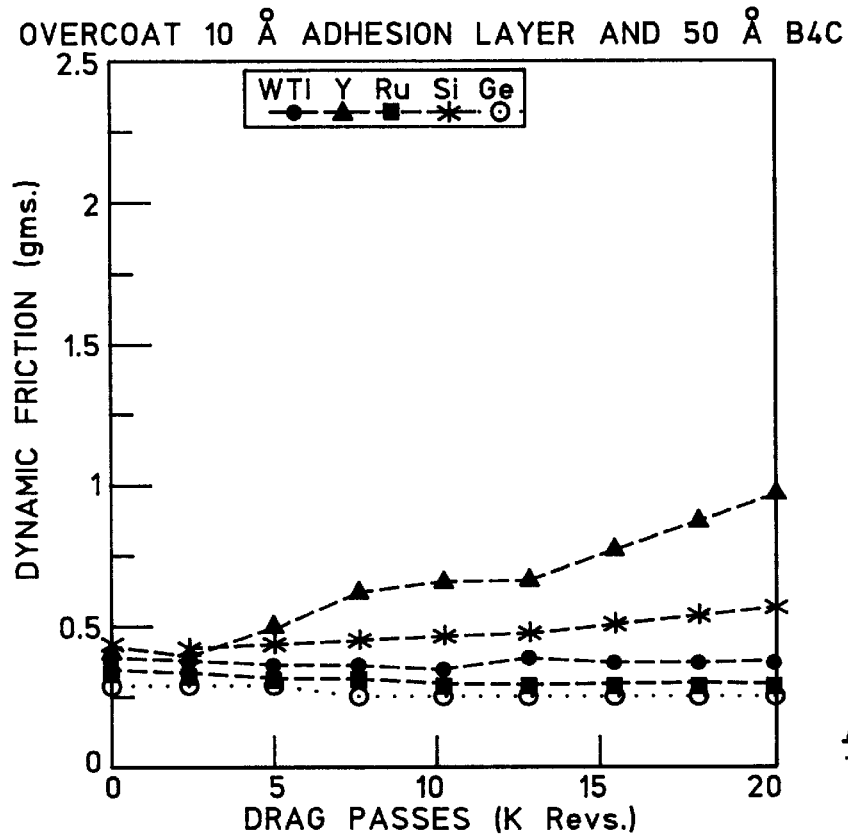
FIG. 19 is a graph showing dynamic friction results of drag tests of boron carbide combined with various adhesion layers.

Example 12, which is shown in FIG. 19, is the same test as Example 11, shown in FIG. 18, except only the good adhesion layers were tested and only the dynamic friction values were plotted against number of drag passes. It can be seen from this test that low friction values were observed when adhesion layers were Ge, Ru, WTi, Si and Y.

EXAMPLE 13

Figure 20:
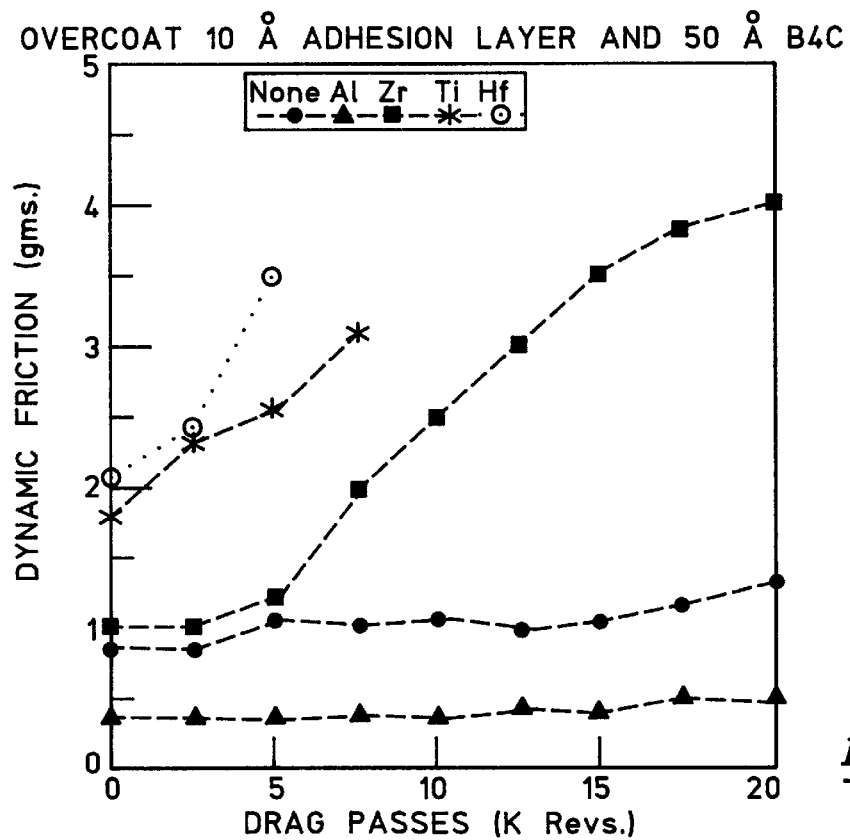
FIG. 20 is a graph showing dynamic friction results of drag tests of boron carbide combined with various adhesion layers.

Example 13, which is shown in FIG. 20, is the same test as Example 12, shown in FIG. 19, except the friction values for four poorly performing adhesion layers of Example 11, shown in FIG. 18, are plotted. From this test it can be seen that the ranking from highest to lowest is Al, Zr, Ti, and Hf. It should be noted that Al had low friction even though it failed in drag test of Example 11 (FIG. 18). Accordingly, Al needs further investigation.

EXAMPLE 14

Figure 21:
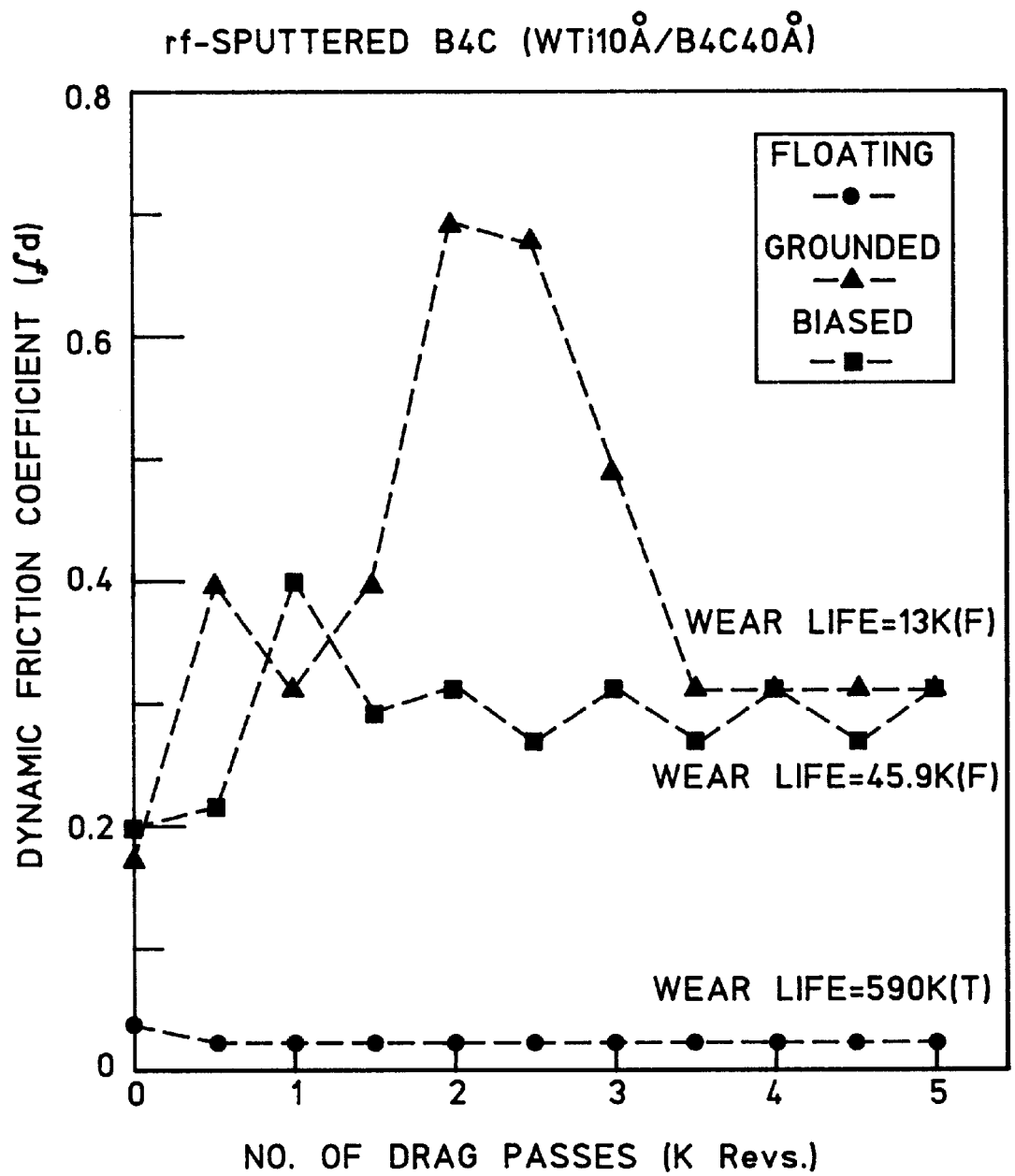
FIG. 21 is a graph showing dynamic friction coefficient results of drag tests of a layer of boron carbide sputtered under the conditions of biased, grounded, and floating potential.

Example 14, which is shown in FIG. 21, is a drag test of a disk having 40 Å thick B4C overcoat layer on top of 10 Å thick WTi thick adhesion layer with a BLC slider doing the dragging. A B4C overcoat layer was rf sputtered with the potential of the substrate disk biased, grounded or floating. It can be seen from this test that when B4C is sputter deposited with the substrate at floating potential, the wear life of the B4C overcoat layer is significantly greater than when the substrate is grounded or biased. This indicates that a more durable and wear resistant B4C overcoat layer can be sputter deposited using an ideal substrate bias obtained by keeping the substrate at floating potential.

EXAMPLE 15

Figure 22:
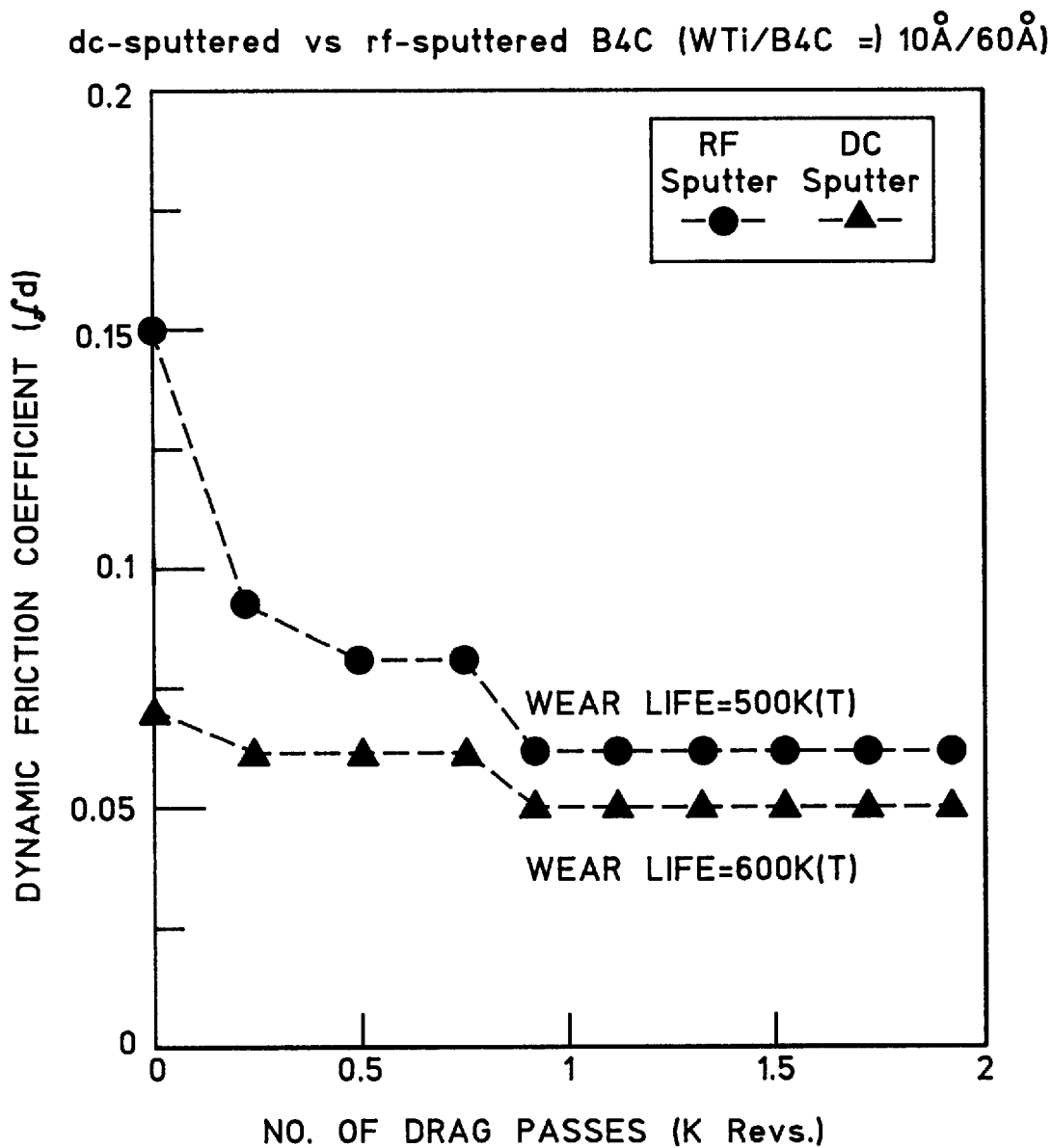
FIG. 22 is a graph showing dynamic friction coefficient results for a boron carbide layer formed by RF sputtering and a boron carbide layer formed by DC sputtering.

Example 15, which is shown in FIG. 22, is a drag test with a BLC slider comparing dc sputtered versus rf sputtered 60 Å thick B4C overcoat layer on top of a 10 Å thick WTi adhesion layer. It can be seen from this test that the wear life and dynamic friction values of the dc sputtered B4C is roughly the same as the wear life and friction coefficient values of the rf sputtered B4C.

From the above examples it can be seen that a single B4C overcoat layer or a B4C overcoat layer combined with an appropriate adhesion layer significantly reduces the thickness of the overcoat layer required for a magnetic disk. The invention reduces the spacing loss which equates to higher density magnetic disk drives. The method of making the B4C overcoat layer contributes to durability of the B4C overcoat layer by floating the substrate of the magnetic disk in the plasma chamber and maintaining the argon pressure and sputtering wattage at low levels. It is speculated that these unique process steps enhance the density of the B4C overcoat layer resulting in increased durability.

Obviously other embodiments and variations of the invention are possible in light of the above teachings and the invention is to be limited only by the claims which follow.

We claim:

1. A method of making an overcoat layer on a magnetic disk which has a magnetic layer on top of a substrate comprising the steps of:

placing the magnetic disk in a chamber;

forming an adhesion layer directly on top of the magnetic layer;

sputtering a boron carbide overcoat layer of substantially B4C directly on top of the adhesion layer;

a ratio of a thickness of the adhesion layer to a thickness of the boron carbide overcoat layer being in a range of ⅕ to ½; and the adhesion layer being selected from the group consisting of Ge, Ru, WTiSi, WTi, Si and Y.

2. A method as claimed in claim 1 including the step of:

providing an atmosphere of Argon with a pressure of substantially 5 millitorr while sputtering the boron carbide overcoat layer.

3. A method as claimed in claim 1 wherein the step of sputtering comprises sputtering at a power level less than 1.0 KW.

4. A method as claimed in claim 1 wherein the adhesion layer is Ge.

5. A method as claimed in claim 1 wherein the adhesion layer is WTi.

6. A method as claimed in claim 1 wherein the adhesion layer is Al.

7. A method of making an overcoat layer on a magnetic disk which has a magnetic layer on top of a substrate comprising the steps of:

placing the magnetic disk in a sputtering chamber;

forming an adhesion layer of WTi directly on the magnetic layer of the magnetic disk;

rf sputtering a layer of boron carbide (B4C) directly on the adhesion layer;

the thickness of the adhesion layer being 10 Å and the thickness of the boron carbide layer being 40 Å; and while sputtering the boron carbide layer providing an atmosphere of argon in the chamber with a pressure of substantially 5 millitorr, a puttering power level less than 1.0 KW and a floating potential of the magnetic disk.

8. A method of making an overcoat layer on a magnetic disk which has a magnetic layer on top of a substrate comprising the steps of:

forming an adhesion layer selected from the group consisting of Ge, Ru, WTiSi, WTi, Si, Y and Al directly on the magnetic layer; and sputter depositing a wear layer of B4C directly on the adhesion layer.

9. A method as claimed in claim 8 wherein the adhesion layer is Ge.

10. A method as claimed in claim 8 wherein the adhesion layer is Ru.

11. A method as claimed in 8 wherein the adhesion layer is WTiSi.

12. A method as claimed in claim 8 wherein the adhesion layer is WTi.

13. A method as claimed in claim 8 wherein the adhesion layer is Si.

14. A method as claimed in claim 8 wherein the adhesion layer is Y.

15. A method as claimed in claim 8 wherein the adhesion layer is Al.

16. A method as claimed in claim 8 wherein the overcoat layer has a thickness greater than 25 Å and less than 75 Å.

17. A method as claimed in claim 16 wherein the overcoat layer has a thickness at least 50 A Å and less than 75 Å.

18. A method as claimed in claim 16 wherein the overcoat layer has a thickness at least 25 Å and less than 50 Å.

19. A method as claimed in claim 16 wherein a ratio of thickness of the adhesion layer to the thickness of the boron carbide layer is in the range of ⅕ to ½.

20. A method as claimed in claim 19 wherein the adhesion layer is Ge.

21. A method as claimed in claim 19 wherein the adhesion layer is Ru.

22. A method as claimed in claim 19 wherein the adhesion layer is WTiSi.

23. A method as claimed in claim 19 wherein the adhesion layer is WTi.

24. A method as claimed in claim 19 wherein the adhesion layer is Si.

25. A method as claimed in claim 19 wherein the adhesion layer is Y.

26. A method as claimed in claim 19 wherein the adhesion layer is Al.

27. A method as claimed in claim 8 including:

while sputtering the layer of boron carbide (B4C) maintaining a floating potential on the substrate throughout said sputtering.

28. A method as claimed in claim 27 wherein the overcoat layer has a thickness greater than 25 Å and less than 75 Å.

29. A method as claimed in claim 28 wherein the overcoat layer has a thickness at least 50 Å and less than 75 Å.

30. A method as claimed in claim 28 wherein the overcoat layer has a thickness at least 25 Å and less than 50 Å.

31. A method as claimed in claim 28 wherein a ratio of thickness of the adhesion layer to the thickness of the boron carbide layer is in the range of ⅕ to ½.

32. A method as claimed in claim 31 wherein the adhesion layer is Ge.

33. A method as claimed in claim 31 wherein the adhesion layer is Ru.

34. A method as claimed in claim 31 wherein the adhesion layer is WTiSi.

35. A method as claimed in claim 31 wherein the adhesion layer is WTi.

36. A method as claimed in claim 31 wherein the adhesion layer is Si.

37. A method as claimed in claim 31 wherein the adhesion layer is Y.

38. A method as claimed in claim 31 wherein the adhesion layer is Al.

* * * * *